April 17, 1945.  J. S. PLUMEAU ET AL  2,373,975
TIRE PRESS
Filed July 18, 1942  2 Sheets-Sheet 1
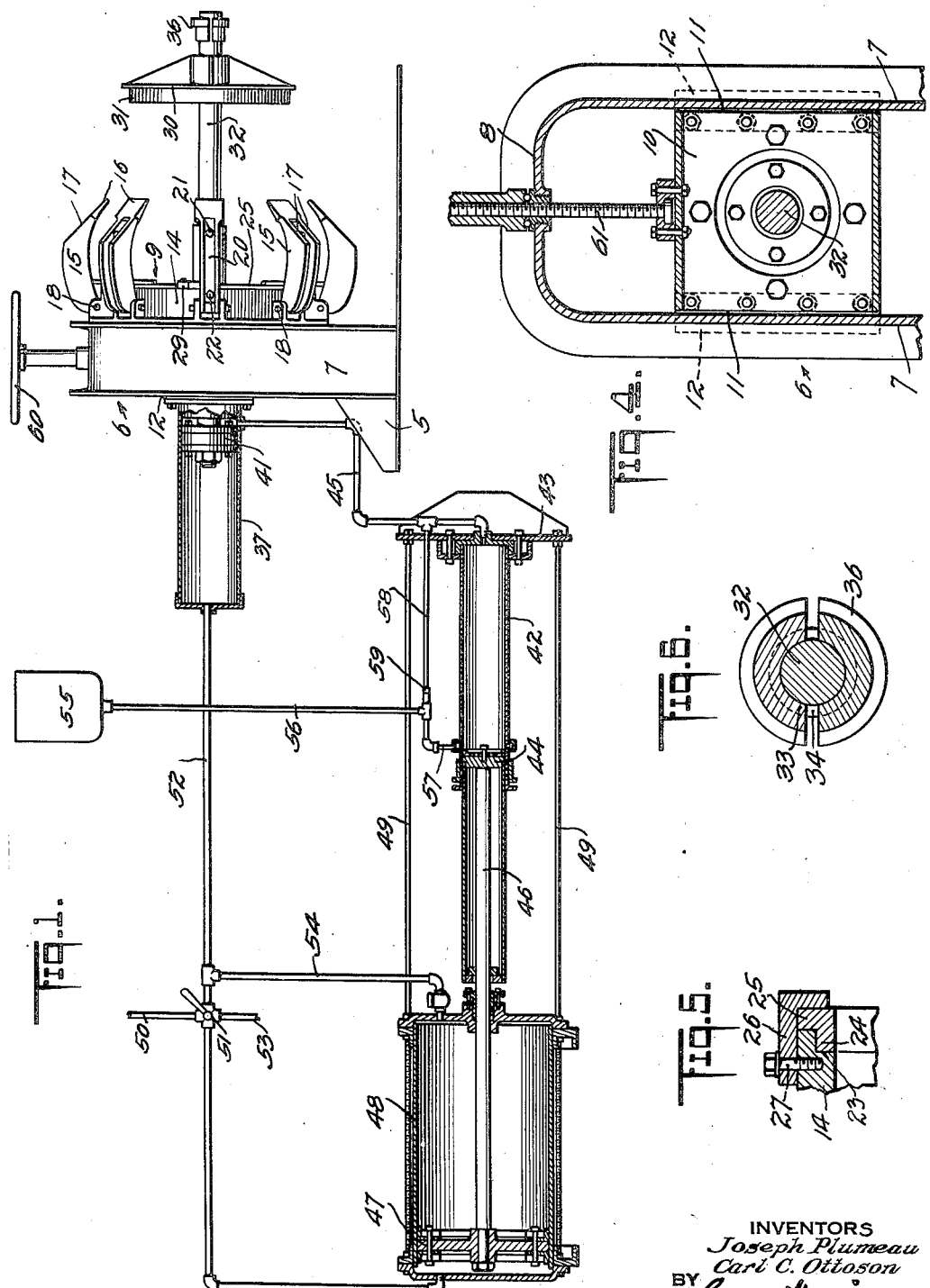
INVENTORS
Joseph Plumeau
Carl C. Ottoson
BY George H. Mitchell
ATTORNEY April 17, 1945.  J. S. PLUMEAU ET AL  2,373,975
TIRE PRESS
Filed July 18, 1942  2 Sheets-Sheet 2
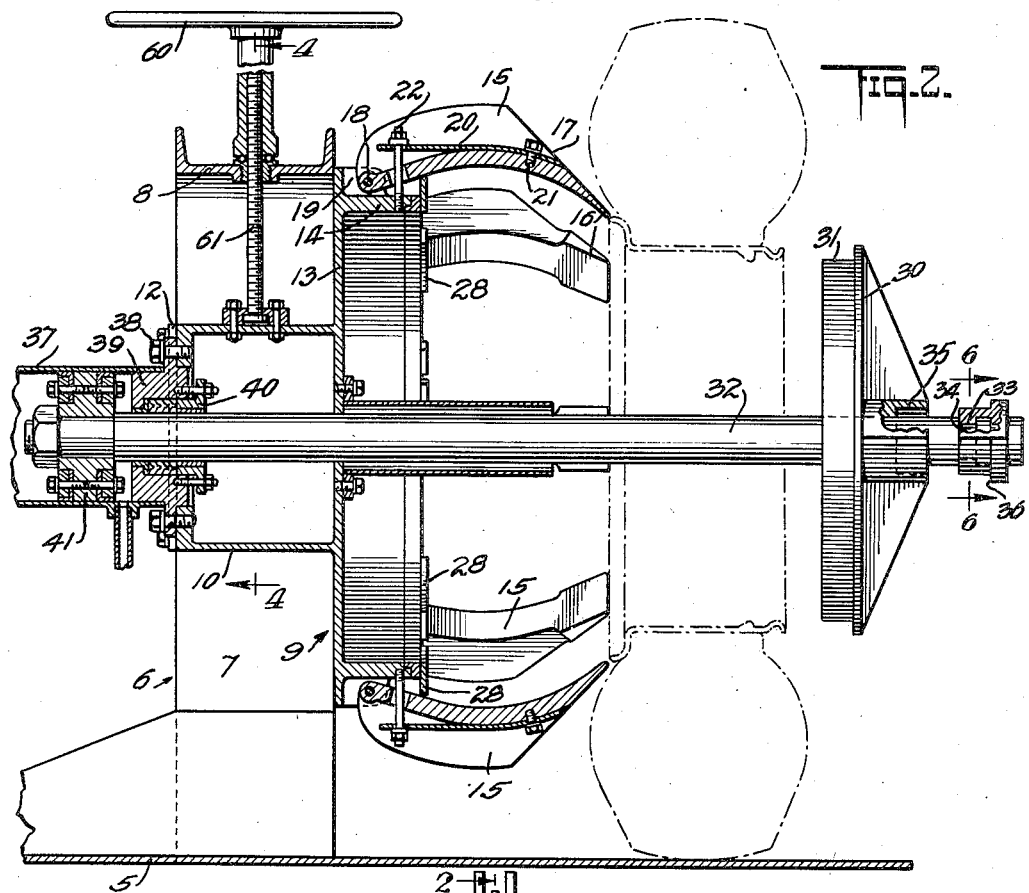
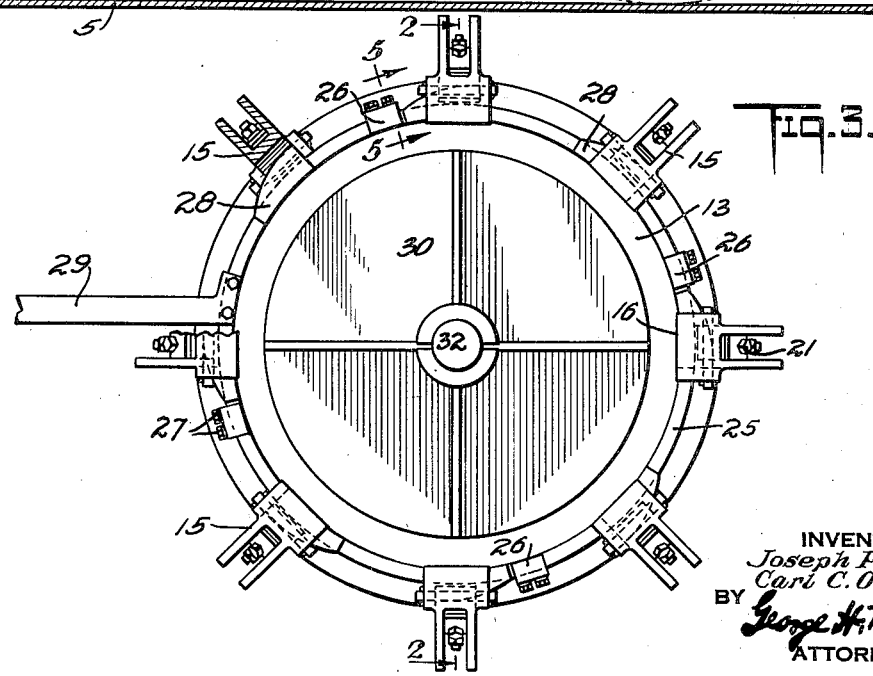
INVENTORS
Joseph Plumeau
Carl C. Ottoson
BY George H. Mitchell
ATTORNEY Patented Apr. 17, 1945

2,373,975

UNITED STATES PATENT OFFICE 2,373,975

TIRE PRESS

Joseph S. Plumeau, Bellaire, Long Island, and Carl C. Ottoson, West Brighton, Staten Island, N. Y.

Application July 18, 1942, Serial No. 451,518

3 Claims. (Cl. 157—6)

Our invention relates to a tire press particularly adapted for removing tires from rims. When tires have been on rims for a protracted period, they often become rusted or stuck quite fast to the rims. It is a difficult matter, particularly with larger size truck and bus tires, to remove the tires from the rims without injury to the tires or tubes. Furthermore, the act of removing a large tire from a rim by the ordinary methods now in use is a laborious undertaking.

It is an object of the invention to provide an improved power actuated means for removing tires from rims.

It is another object to provide improved means for actuating a tire remover and for quickly resetting the parts.

Another object is to provide an improved tire removing means, so arranged as to obviate the necessity for lifting the tire and rim.

Still another object is to provide tire removing means which is readily adjustable for various sizes of tires.

It is another object to provide various features of novelty and improvement in a tire removing means, all looking to reliability, ease of operation, sturdiness of construction, and reasonableness in cost.

Briefly stated, in a preferred form of the invention, we employ tire strippers, which may be in the form of stripper fingers and a rim abutment, together with means for moving the rim abutment and stripping means relatively to each other for stripping the tire from the rim. The means for moving the stripper mechanism and tire abutment relatively to each other may be in the form of fluid pressure actuated means, the active or stripping motion being effected by means of hydraulic pressure fluid. The return movement may be advantageously effected by compressed air or like elastic fluid. The parts of the tire removing means are preferably so arranged that the tire may rest upright on a floor or base and be rolled into proper position on the tire remover, thus obviating the necessity of lifting heavy tires and rims. The tire removing means preferably consists of a unitary structure, which may be adjusted in unitary fashion so as to accommodate the various parts to tires and rims of varying size.

In the drawings which show, for illustrative purposes only, a preferred form of the invention—

Fig. 1 is a general view of a tire press in side elevation, illustrating features of the invention, some parts being shown in more or less diagrammatic fashion and some in section;

Fig. 2 is a central, vertical, sectional view through the tire press shown in Fig. 1, the plane of the section being indicated 2—2 in Fig. 3;

Fig. 3 is a right hand view in elevation of the machine shown in Fig. 2, a part being shown in section to illustrate partly concealed features;

Fig. 4 is a fragmentary, sectional view, taken substantially in the plane of the line 4—4 of Fig. 2;

Fig. 5 is an enlarged fragmentary, detail sectional view, taken substantially in the plane of the line 5—5 of Fig. 3;

Fig. 6 is an enlarged sectional view, taken substantially in the plane of the line 6—6 of Fig. 2.

In the form illustrated, our improved tire press or tire remover includes a base or floor part 5 carrying an upstanding frame 6. The frame may be formed of upright channel members 7—7 and a top or connecting channel member 8. The channel members 7—8, as illustrated, are in one piece, but of course the structure may be made up of fabricated channel parts, if desired. The tire press preferably comprises a unitary structure including a carrier designated generally 9. The carrier may include a slide 10 having slide surfaces 11—11 to fit between and be guided by the inner slide surfaces on the upstanding channel members 7—7. At the rear of the slide 10, there may be guide plates 12—12 secured to the slide and serving to hold the slide against endwise displacement from its slideways. Forwardly of the slide we may provide a carrier plate 13 preferably of disk or circular form and which may be formed integrally with or connected to the slide portion 10. The plate 13 preferably fits against the forward edges of the channel members 7—7, and thus the plate 13 together with the plates 12—12 serve to securely position the slide 10 on the frame and between the slideways.

The carrier plate 13 in the form illustrated carries stripping mechanism. The plate may have a forwardly or axially extending flange 14 for carrying the tire stripping means, which in the form shown consists of a plurality of stripper fingers 15—15. Each stripper finger may be of generally channel shape, as is clearly illustrated in the drawings, and may have relatively flat, thin finger parts 16 at the ends for engagement with the side of a tire. The stripper fingers 15 preferably are slabbed off as indicated at 17 so as to form beveled surfaces which, when engaging the inturned side of a tire, will tend to force the fingers inwardly between the flange of the rim and the tire, so as to effectively strip the tire from the rim, as will be later described. The stripper fingers 15 are pivotally mounted on the flange 14, as by means of pivot pins 18 which extend through bearing bosses on the stripper fingers and through or into opposed ears 19—19, between which ears the stripper fingers are positioned and guided. The pivots 18 preferably are radially outwardly of the forward ends 16 of the stripper fingers so that tire pressure on the ends of the fingers will tend to force the fingers radially inwardly into the space between the side of the tire and its rim. In addition to thus positioning the pivots relatively to the ends of the fingers, we provide spring means for additionally urging the fingers inwardly. Such spring means may be in the form of flat plate springs 20 secured in the channel portion of each stripper finger as by means of a cap screw 21. The rearward end of the spring 20 may be apertured to loosely receive the bolt 22, secured in the flange 14, and a washer and adjusting nut on the bolt at the outside of the spring may serve as a tension means to adjust the force of the spring tending to force the stripper fingers radially inwardly.

The strippers or fingers are forced outwardly to take care of larger size tires and to position the fingers just outside of the tire rim preparatory to stripping the tire therefrom. The preferred form of finger spreaders is cam means. The flange 14 may be counterbored, as at 23 (Fig. 5), to receive a cam ring 24 having a face flange 25 abutting the front of the flange 14. Angle holding clips 26 extend over the flange 25 and are secured to the flange 14 as by means of cap screws 27. Thus the cam ring 24 is securely but rotatably held on the flange 14. The cam ring 24 adjacent each finger carries a cam 28 welded or otherwise secured thereto and having an inclined cam surface to engage beneath the finger for moving it outwardly against the stress of the spring 20. This cam construction is clearly indicated in Figs. 2 and 3. The cam ring may be shifted as by means of a handle 29 extending into convenient reach of the operator. Cam ring 24 is positioned in a plane perpendicular to draw rod 32, and movable back and forth in that plane by handle 29. Thus, when the handle 29 is depressed to the position as shown in Fig. 3, the cams 28 engaging beneath the fingers will spread the latter all simultaneously. The degree of spreading may of course be determined by the extent to which the handle 29 is depressed. As will be understood, the stripper fingers are arranged to engage the side of the tire and be forced inwardly while forcing the tire from the rim.

The tire rim during the tire stripping operation is engaged by a suitable rim head, which, in the form shown, comprises a webbed disk 30 having a flange 31 to engage within the rim. The rim head 30 is mounted upon a support (in this case a draw rod 32), and suitable means may be provided for quick detachment of the rim head 30 from the draw rod so that the tire and rim may be placed in position between the stripper head and the rim head. In the form shown, the rim head abutment consists of a two-part collar having inwardly directed flanges 33 to fit into a groove 34 in the rod 32. The two-part collar, when in position, is of a size to fit within a counterbore 35 in the rim head 30, and the rear of the rim head abuts against a radial flange 36 on the two-part collar. Thus, when the rim head is moved toward the right (Fig. 2), the two-part collar will be held in place on the draw rod 32 and the rim head 30 will be positioned on the collar by the flange 36.

When the stripper fingers and rim head are moved relatively to each other in stripping direction, that is, toward each other as viewed in Fig. 2, the rim will be engaged by the rim head and the tire will be engaged by the stripper fingers and the tire will be stripped from its rim. The relative movement in the present instance is effected by movement of the rim head toward the left (Fig. 2). This movement of the rim head is preferably effected by fluid pressure actuated means.

In the form shown, the slide 10 at the rear carries a fluid pressure cylinder 37 firmly secured thereto as by means of screws 38 passing through the cylinder head 39 which itself carries the cylinder. The draw rod 32 passes centrally through the flange 14 and is preferably guided therein and passes rearwardly through a stuffing-box 40 in the cylinder head 39. A piston 41 is carried by the rear end of the draw rod 32. Thus the draw rod 32, together with its rim head, will be supported by the carrier through the piston and the wall of the aperture in the disk 13 through which the draw rod 32 passes. The rim head is preferably moved in tire stripping or active direction by hydraulic pressure fluid so as to impart a steady pull to the draw rod and avoid jerks and bangs when the resistance to movement is reduced; for example, when the tire breaks loose from the rim. The rim head may be returned to its normal or open position by any suitable means, but for the sake of speed and economy. I prefer to return the rim head by means of air pressure. A suitable arrangement for effecting the desired movements of the rim head is illustrated more or less diagrammatically in Fig. 1.

In Fig. 1 is illustrated a hydraulic cylinder 42, which may be carried by a webbed plate or strong back 43 resting edgewise on a floor or support. A plunger 44 is movable in the cylinder 42 and hydraulic fluid in front of the plunger 44 will be forced from the cylinder through piping 45 (preferably flexible at least in part) into the tail end of the cylinder 37 so as to urge the piston 41 toward the left as viewed in Figs. 1 and 2. The capacity of the cylinder 42 is preferably about equal to the capacity of the tail end of the cylinder 37 when the piston therein is at the left. The plunger 44 in the hydraulic pressure generator is preferably actuated by a piston rod 46 connected to an air piston 47 in an air cylinder 48, which may be connected as by means of rods 49—49 to the strong back 43 and thus the hydraulic pressure generator and the air cylinder form in effect a unit. Air from the compressed air pressure pipe 50 is controlled by a hand valve 51 of any well known or desired construction so as to admit air to the head end of the cylinder 48 and exhaust air from the tail end thereof, whereby hydraulic fluid from cylinder 42 will be forced into the tail end of cylinder 37. When the tire stripping piston 41 has been moved to its left-end position and the tire stripped from the rim, the piston 41 is then moved to the right to return the rim head to normal position. The movement of the piston to the right is preferably effected by compressed air. In the form shown, the valve 51 controls admission and exhaust of air in flexible pipe 52, which is connected to the head end of the cylinder 37. The piping and valve are such that, when the head end of air cylinder 48 is connected to the exhaust pipe 53, compressed air will be admitted through pipe 54 to the tail end of air cylinder 48 and also to the head end of cylinder 37. Thus, air pressure on the head of the piston 41 will move the latter and with it the rod 32 and rim head to the extreme right or normal position. During this movement, hydraulic pressure fluid at the tail end of the cylinder 37 will be forced through pipe 45 into the hydraulic cylinder 42 so as to return the plunger 44 to the position shown in Fig. 1, and also return the air piston 47 to its normal position, as in Fig. 1, unless, of course, the air pressure through pipe 54 has already returned the air piston to its normal position.

In order to maintain the proper supply of hydraulic pressure fluid, we may employ a pressure fluid reservoir 55 with may feed by gravity through pipe 56 and cylinder connection 57 at the end of the cylinder 42. Thus, when the plunger 44 is in its extreme left-hand position as shown in Fig. 1, hydraulic fluid may pass from the reservoir 55 into the cylinder 42 and always maintain it full. There is also a pipe connection 58 between the reservoir 55 and the head end of the cylinder 42 so as to always supply fluid to the head end of the cylinder 42 in case the pressure therein is lower than the head provided in the reservoir 55. In other words, if there is no tendency to pull a vacuum in the head end of cylinder 42 and thus cause air leakage into the system, fluid from the reservoir 55 will pass through pipe 58 into the head end of cylinder 42. A check valve 59, opening toward the head end of cylinder 42, will prevent flow from the head end of cylinder 42 back into reservoir 55. The novel features of the pneumatic hydraulic system illustrated in Fig. 1 are not specifically claimed herein but are claimed in the application of Carl C. Ottoson, Serial No. 451,519, filed July 18, 1942, to which application reference is made for a fuller disclosure of the details of that system.

The operation of the device is as follows:

With the parts positioned as shown in Figs. 1 and 2, the stripper head 30 is moved slightly forwardly, the two-part abutment collar is removed, and the stripper head 30 removed from the draw rod. A tire carrying a rim may then be rolled into place, as shown in dot-dash lines in Fig 2. If the setting of the carrier is not proper for the particular sized tire to be stripped, the hand wheel 60 is rotated about the screw 61 fastened to the slide 10. The entire carrier will then be raised or lowered until the tire and rim are concentric with the stripper fingers and the head. A rim head of proper size to fit the rim is then put in place on the draw rod 32 and secured by means of the abutment collar, as heretofore described. The handle 29 may then be employed to shift the cam ring 24 to position the stripper fingers radially so that they just clear the edge of the rim as shown in Fig. 2. Then the air valve 51 is turned so as to admit compressed air to the head end of the air cylinder and to exhaust compressed air from the tail end thereof and from the head end of the hydraulic cylinder 37. The air piston 47 and the plunger 44 will then move toward the right and hydraulic fluid pressure will force the piston 41 and with it the draw rod 32 and rim head toward the left so as to cause the head to engage the rim (if it has not already been positioned on the rim) and further movement will cause the stripper fingers to engage the side of the tire just outside of the rim. The handle 29 is then raised, turning the cam ring 24 clockwise, Fig. 3, thereby releasing the individual cams 28 from engagement with the stripper fingers, and allowing the springs 20 to force the stripper fingers inwardly to engage between the tire and outer edge of the rim. As the draw rod continues to move inwardly, the beveled ends of the carrier fingers are forced inwardly, by the combined action of springs 20 and the engagement of such beveled ends against the tire wall. Still further movement of the rim head will cause the tire to break loose from the rim and force the rim inwardly so as to strip the tire therefrom. It should be noted that under hydraulic pressure the movement will be steady and sustained. Furthermore, the dashpot action of a hydraulic system will prevent unduly fast movement or banging of parts when the resistance is suddenly released, as when the tire breaks loose or is stripped from its rim. When the tire has been stripped, the valve 51 is reversed so as to exhaust air from the head end of air cylinder 48 and to apply air pressure to the head end of hydraulic cylinder 37 and also preferably apply air pressure to the tail end of air cylinder 48. The parts will then be returned to the positions shown in Figs. 1 and 2. The rim head 30 may then be removed and the rim removed, as will be clearly understood.

While the invention has been described in considerable detail and a preferred form illustrated, it is to be understood that various changes may be made within the scope of the invention as defined in the appended claims.

We claim:

1. In a machine for stripping tires from rims, a carrier, a plurality of tire stripper fingers arranged in circular formation about said carrier, means for pivoting each said stripper finger on said carrier so as to swing in a generally radial plane, spring means for urging all of said stripper fingers radially inwardly, a manually actuable member for simultaneously pivoting all of said stripper fingers radially outwardly against the stress of said spring means, a draw rod passing through said carrier, a rim head on said draw rod, and means in rear of said carrier for drawing said draw rod to move the rim head carried thereby toward said stripper fingers.

2. In a machine for stripping tires from rims, a carrier, a plurality of tire stripper fingers arranged in circular formation about said carrier, means for pivoting each said stripper finger on said carrier so as to swing in a generally radial plane, spring means for pivoting all of said stripper fingers radially inwardly, a draw rod passing through said carrier, a rim head on said draw rod, a manually operable cam ring concentric with said draw rod and rim head, and positioned in a plane perpendicular to said draw rod and oscillatable back and forth in said plane about said draw rod, said cam ring being provided with cam surfaces engageable individually with said stripper fingers for pivoting said stripping fingers outwardly against the stress of said spring means when the ring is moved in one direction, and also serving to release said stripper fingers to allow them to pivot inwardly, under the influence of said springs, when the ring is moved in the opposite direction, and means in rear of said carrier for drawing said draw rod to move the rim head carried thereby toward said stripper fingers.

3. In a machine for stripping tires from rims, a frame, tire stripping mechanism mounted for vertical adjustment in said frame, said tire stripping mechanism comprising a carrier, a draw rod passing through said carrier, a rim head on said draw rod, a plurality of tire stripper fingers arranged in circular formation about said carrier, means for pivoting each stripper finger on said carrier so as to swing in a generally radial plane, spring means for urging all of said stripper fingers radially inwardly, a manually operable cam ring concentric with said draw rod and rim head, provided with cam surfaces engageable individually with said stripper fingers for forcing said stripper fingers outwardly against the stress of said spring means when the ring is moved in one direction, and also serving to release said stripper fingers when the ring is moved in the opposite direction, means in rear of said carrier for drawing said draw rod and the rim head carried thereby toward said stripper fingers, and means for raising and lowering said tire stripping mechanism in said frame to position said mechanism at different levels to accommodate different sized tires.

JOSEPH S. PLUMEAU.
CARL C. OTTOSON.